Sept. 11, 1934.  G. R. MEYERCORD  1,972,942
METHOD OF PRODUCING PANEL HAVING A CHARRED FACE
Filed May 27, 1933
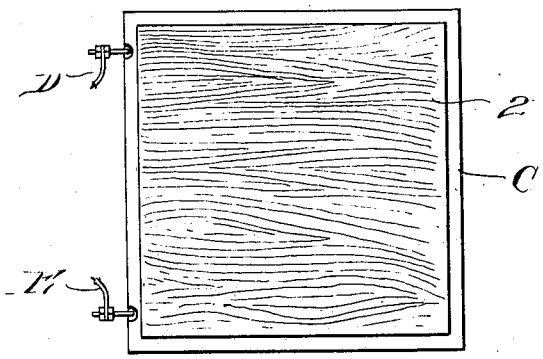
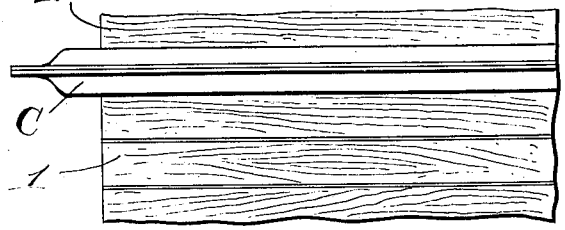
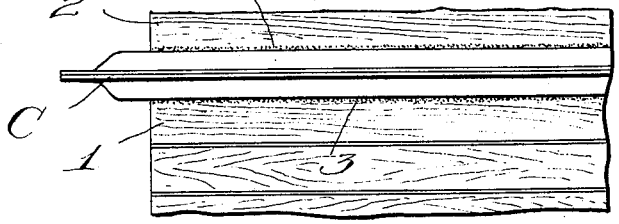

Patented Sept. 11, 1934

1,972,942

UNITED STATES PATENT OFFICE 1,972,942

METHOD OF PRODUCING PANEL HAVING A CHARRED FACE.

George R. Meyercord, Chicago, Ill., assignor, by mesne assignments, to Reconstruction Finance Corporation, a Federal corporation Application May 27, 1933, Serial No. 673,174

4 Claims. (Cl. 144—309)

Wood panels or boards having a charred face are used to a considerable extent; as for example, in the form of barrels used for certain purposes. The object of the present invention is to make possible the production in a simple and inexpensive manner of wood panels or the like charred uniformly and to any desired extent.

In carrying out my invention I place the side of a piece of wood to be charred in contact with a hot plate or caul and quickly raise the temperature of the latter to the charring point; such contact being maintained long enough to produce the desired degree of charring which may be simply such as to give a burnt wood effect finish or go deeply into the wood. My invention accordingly is adapted to form a continuation of certain hot processes of gluing plywood panels, as the charring can be effected by simply raising the temperature of the heating means in contact with the face to be charred. Therefore, viewed in one of its aspects, the present invention may be said to have for its object the efficient production of plywood charred to any desired extent.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is an elevation of two plywood panels being glued and charred in a press; Fig. 2 is a section on line 2—2 of Fig. 1; and Figs. 3 and 4 are edge views, on a much larger scale, of fragments of the two panels, showing, respectively, the conditions at the end of the gluing operation and at the end of the charring operation.

Referring to the drawing, A and B represent the upper and lower platens of a power press. Arranged within the press are two plywood panels, 1 and 2, having interposed between them a flexible heat-supplying plate or caul C. The member C may be heated in any suitable way so as to cause the synthetic resin, for example, disposed between the plies of each panel, to melt and then set while the press remains closed. Thus the heating element may be an electrically heated pad supplied with current by suitable conductors D and E.

The temperature at which the gluing with synthetic resin is done is in the neighborhood of 330° F., whereas, in order effectively to char the wood, a much higher temperature is required. In accordance with my invention, I quickly raise the temperature of the heating element at the end of the gluing operation, and while the work is still hot, to produce the desired charring; the height to which the temperature is raised and the length of time that it is maintained depending upon the degree of charring desired. In some instances the temperature will be raised to 500° F. or more, where deep charring is sought. The charring period is preferably terminated by opening the press, as well as by shutting off the current where the heating element is of the electrical type.

At the end of the gluing operation the conditions are as illustrated in Fig. 3 whereas, the charring step produces the change illustrated in Fig. 4, which shows both panels charred uniformly to an appreciable depth below the surfaces in contact with the heating element, as indicated at 3, 3.

I have illustrated and described my invention in connection with the process of gluing up plywood since the charring of plywood should naturally follow directly upon the gluing; thereby not only avoiding the necessity of an additional handling of the panels to char the same, but, also, making use of the comparatively high temperature to which the wood is brought to glue the same and thus making it possible to heat the wood to the charring point quickly and with the consumption of a minimum amount of energy. When the cauls or pads by which the heat is delivered or through which it is transmitted to the panels are flexible and of the cushion type, not only will there be a more uniform distribution of pressure on the work in gluing, but the subsequent charring will be more uniform than would be the case if the cauls were rigid and could not adapt themselves to the contours of the faces of the panels. Some of the advantages of my invention may be secured in other ways, however, and I therefore do not desire to limit the scope of my invention further than is indicated by the definitions of my invention constituting the appended claims.

I claim:

1. The method of producing a plywood panel having a charred face which consists in gluing up the panel in a press with a face in engagement with a hot plate or caul and, at the end of the gluing operation, raising the temperature of the said hot plate or caul high enough to char the adjacent face of the panel.

2. The method of producing a plywood panel having a charred face which consists in gluing up the panel in a press with a face in engagement with a hot plate or caul and, at the end of the gluing operation, quickly raising the temperature of the said hot plate or caul high enough to char the adjacent face of the panel.

3. The method of producing a plywood panel having a charred face which consists in gluing up the panel in a press with a face in engagement with a hot plate or caul and, at the end of the gluing operation, quickly raising the temperature of the said hot plate or caul high enough to char the adjacent face of the panel, and then opening the press before the charring enters deeply into the wood.

4. The method of producing a plywood panel having a charred face which consists in placing in a press the assembly to be glued up into panel form, with one face of the assembly in engagement with an electrically heated hot plate or caul, energizing the hot plate or caul to cause it to become heated sufficiently to effect the gluing of the panel, and then increasing the energy input to the hot plate or caul sufficiently to raise the temperature high enough to char the adjacent face of the panel.

GEORGE R. MEYERCORD.